J. T. KRIEGER.
CAR AXLE MOUNTING.
APPLICATION FILED JULY 28, 1919.
1,347,280.
Patented July 20, 1920.
2 SHEETS—SHEET 2.
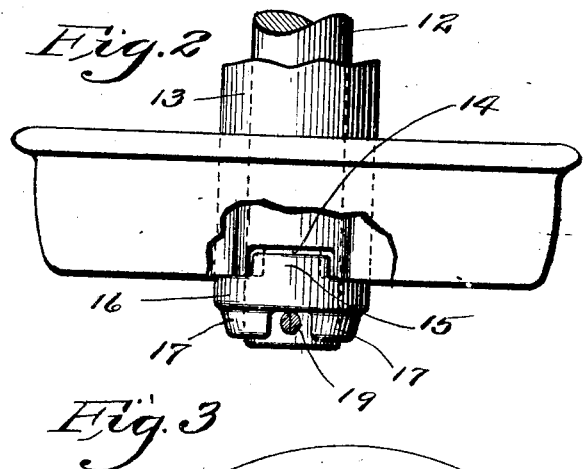
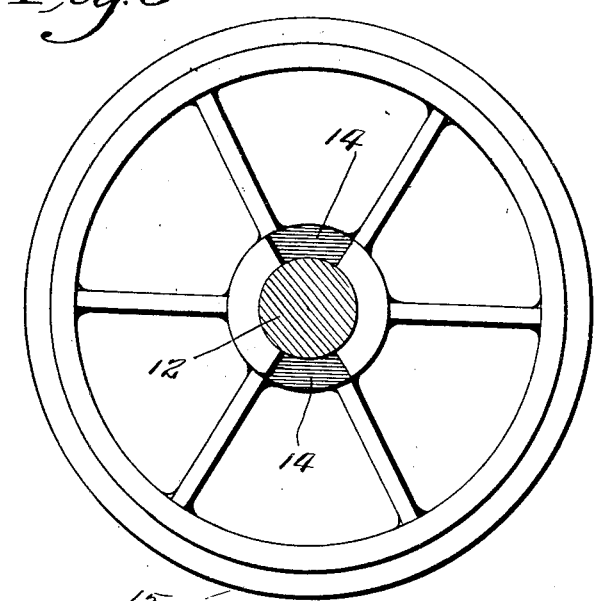
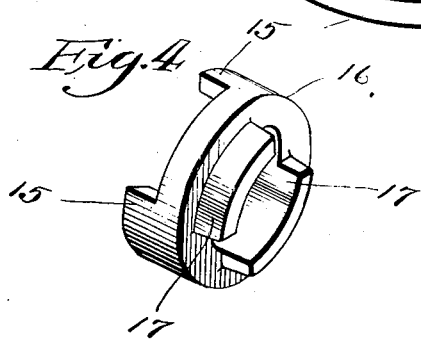
Inventor
John T. Krieger
By J. M. Conway, Atty.

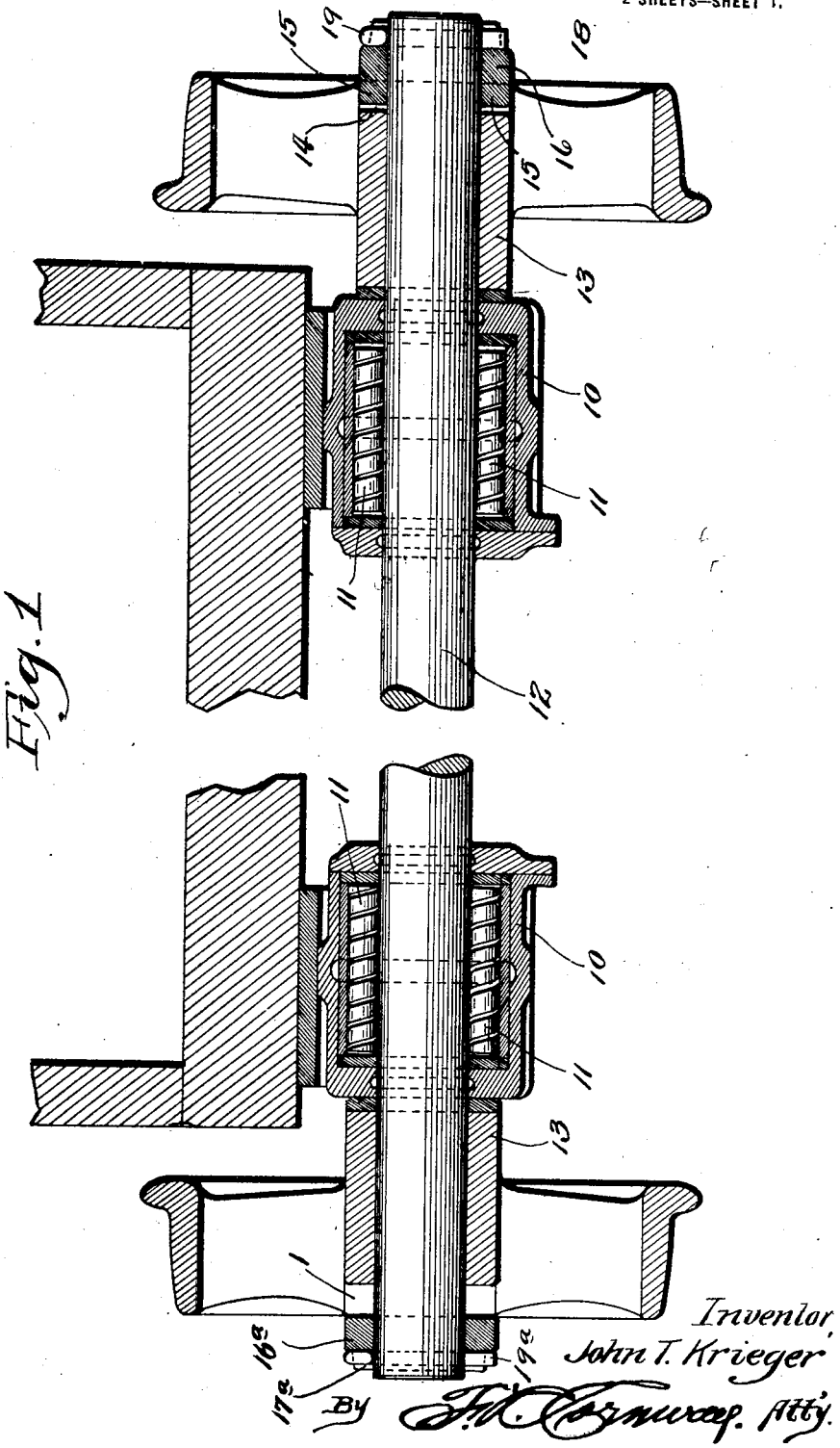

UNITED STATES PATENT OFFICE.

JOHN T. KRIEGER, OF ST. LOUIS, MISSOURI, ASSIGNOR TO LINCOLN STEEL AND FORGE COMPANY, OF ST. LOUIS, MISSOURI, A CORPORATION OF MISSOURI.

CAR-AXLE MOUNTING.

1,347,280.  Specification of Letters Patent.  Patented July 20, 1920.

Application filed July 28, 1919. Serial No. 313,847.

*To all whom it may concern:*

Be it known that I, JOHN T. KRIEGER, a citizen of the United States, residing at St. Louis, Missouri, have invented a certain new and useful Improvement in Car-Axle Mounting, of which the following is a full, clear, and exact description, such as will enable others skilled in the art to which it appertains, to make and use the same, reference being had to the accompanying drawings, forming part of this specification.

My invention relates generally to mining cars and more particularly to the wheel carrying axles thereof, the principal object of my invention being to provide simple and efficient means for mounting the axle upon the car body and the wheels upon said axle so that one of the wheels is free to rotate independently of the axle, thereby enabling the car to traverse curved portions of the track with less resistance than where both wheels are fixed to the axle.

A further object of my invention is to provide improved means for mounting the wheels upon the axle and which means is capable of being readily detached in the event that it becomes necessary to remove either one or both of the wheels.

With the foregoing and other objects in view, my invention consists in certain novel features of construction and arrangement of parts, hereinafter more fully described and claimed, and illustrated in the accompanying drawings, in which—

Figure 1 is a transverse section through the lower portion of a mine car and showing the same equipped with an axle that is provided with my improved wheel securing means.

Fig. 2 is a plan view of one of the wheels with parts broken away in order to more clearly illustrate the wheel securing means.

Fig. 3 is an elevational view of a mine car wheel, the hub of which is constructed to receive the retaining means contemplated by my invention.

Fig. 4 is a perspective view of one of the wheel locking washers contemplated by my invention.

Referring by numerals to the accompanying drawings, 10 designates boxes containing roller bearings 11 of usual construction and which boxes are applied in any suitable manner to the underside of a mine car or the underframe thereof. Supported in the usual manner within these roller bearings is an axle 12, the end portions of which project a sufficient distance beyond the journal boxes to receive the usual wheels.

In accordance with my invention, the outer ends of the hubs 13 of the wheels are provided with a pair of oppositely disposed notches or recesses 14 which are adapted to receive a pair of oppositely arranged lugs 15, the latter being formed integral with and projecting inwardly from a lock washer 16. This washer is positioned on the end portion of the axle immediately adjacent to the hub of the wheel, and formed integral with and projecting outwardly from the outer face of said washer is a pair of oppositely disposed lugs 17.

Formed through the outer end of the axle 12 is a diametrically arranged aperture 18 and seated therein is a cotter pin 19 or like securing device, the projecting end portions of which occupy the spaces between the ends of the lugs 17. This arrangement, it will be seen, secures the locking washer to the axle, and by virtue of the engagement of the lugs 15 within the recesses 14 of the wheel hub the wheel is secured to the axle 12 so that it rotates therewith.

In order that the wheels of each axle may have differential movement in passing around curved portions of the track, it is necessary that one wheel be mounted so as to rotate independently of the axle and the wheel which is fixed thereto, and in order to accomplish this, I provide a washer 16ª which is provided with lugs 17ª which receive the end portions of a cotter pin or like device 19ª, but this last mentioned washer is devoid of the inwardly projecting lugs 15 so that it does not lock the adjacent wheel to the car axle. This last mentioned arrangement is shown at the lefthand end of the axle in Fig. 1 while the wheel on the righthand end of said axle is locked to the axle by the washer 16 that is provided with the lugs 15.

Thus the axle is mounted to rotate freely in the roller bearings within the boxes 10 and one of the wheels is positively locked to one end of said axle while the opposite wheel is free to rotate freely independently of the axle and the fixed wheel, and as a result, said wheels will traverse curved portions of the track with much less friction and resistance than where both wheels are fixed to the axle.

A wheel and axle mounting of my improved construction is comparatively simple, can be easily and cheaply manufactured, can be readily assembled or taken apart, and is very efficient in use.

It will be readily understood that minor changes in the size, form and construction of the various parts of my improved mounting can be made and substituted for those herein shown and described, without departing from the spirit of my invention, the scope of which is set forth in the appended claims.

What I claim is:

1. The combination with an axle and wheel mounted thereupon, the outer end of the hub of which wheel is provided with shoulders, of a lock washer secured to the axle adjacent to the wheel, and said lock washer being provided with shoulders adapted to engage the shoulders on the hub of the wheel.

2. The combination with an axle and wheel mounted thereupon, the outer end of the hub of which wheel is provided with shoulders, of a lock washer mounted on the axle and provided with shoulders adapted to engage the shoulders on the hub of the wheel, and detachable means for securing said lock washer to said axle.

3. In combination with an axle and wheel mounted thereupon, a washer positioned on the axle one face of which having interengaging connection with the hub of the wheel, the opposite face being provided with lugs whereby the washer is locked to the axle.

4. The combination with an axle and wheel mounted thereupon, the hub of which wheel is provided with shoulders, of a lock washer mounted on the axle adjacent to said wheel and provided on its inner face with shoulders adapted to engage the shoulders on the wheel hub, there being shoulders formed on the outer face of said lock washer, and means seated in the axle and engaging the shoulders on the outer face thereof.

5. The combination with an axle and wheel mounted thereupon, the hub of said wheel being provided with recesses, of a lock washer mounted on the axle, lugs on said washer, which lugs are adapted to engage in the recesses in the wheel hub, lugs projecting from the outer end of said lock washer, and means seated in the axle and engaging the last mentioned lugs.

6. A car wheel locking washer comprising a ring adapted to be positioned upon an axle, wheel engaging lugs projecting from the inner face of said locking washer, and lugs projecting from the outer face of said washer and adapted to receive a retaining member seated in the car axle.

In testimony whereof I hereunto affix my signature this 24th day of July, 1919.

JNO. T. KRIEGER.